(12) United States Patent
Losio et al.

(10) Patent No.: US 11,448,539 B2
(45) Date of Patent: Sep. 20, 2022

(54) GAS FLOW MEASURING CIRCUIT AND GAS FLOW SENSOR

(71) Applicant: Axetris AG, Kägiswil (CH)

(72) Inventors: Paolo Antonio Losio, Horw (CH); Rolf Gebhardt, Uznach (CH)

(73) Assignee: Axetris AG, Kägiswil (CH)

( * ) Notice: Subject to any disclaimer, the term of this patent is extended or adjusted under 35 U.S.C. 154(b) by 0 days.

(21) Appl. No.: 17/147,863

(22) Filed: Jan. 13, 2021

(65) Prior Publication Data

US 2021/0215519 A1 Jul. 15, 2021

(30) Foreign Application Priority Data

Jan. 14, 2020 (EP) .................................... 20151716
Dec. 11, 2020 (EP) .................................... 20213334

(51) Int. Cl.
*G01F 1/696* (2006.01)
*G01F 1/69* (2006.01)

(52) U.S. Cl.
CPC .............. *G01F 1/696* (2013.01); *G01F 1/69* (2013.01)

(58) Field of Classification Search
CPC .......... G01F 1/696; G01F 1/69; G01F 1/6845; G01F 1/698; G01F 1/7084; G01F 1/68; G01K 7/16
See application file for complete search history.

(56) References Cited

U.S. PATENT DOCUMENTS

| 4,334,186 A | * | 6/1982 | Sasayama | ............. G01F 1/6986 323/283 |
| 4,501,144 A | | 2/1985 | Higashi | |
| (Continued) | | | | |

FOREIGN PATENT DOCUMENTS

| CN | 102 829 888 B | 5/2014 |
| DE | 3729073 A1 | 3/1989 |
| (Continued) | | |

OTHER PUBLICATIONS

European Search Report for corresponding Application No. 20 15 1716, dated Jun. 22, 2020.
(Continued)

*Primary Examiner* — Francis C Gray
(74) *Attorney, Agent, or Firm* — Renner, Otto, Boisselle & Sklar, LLP

(57) ABSTRACT

A gas flow measuring circuit includes at least one reference resistor and at least one variable resistor that varies in accordance with the characteristics of the flow of a gas and means for determination of the difference between the reference resistor and variable resistor, with at least one current loop arrangement including first current source means coupled in series with said reference resistor and second current source means coupled in series with said variable resistor wherein both resistors are connected to ground for providing an ideally constant current through the respective resistor to produce first voltages across the reference resistor and second voltages across the variable resistor, and voltage measuring means for measuring the voltage difference between said reference resistor and said variable resistor to produce a characteristic voltage difference representative of the characteristics of the gas.

13 Claims, 6 Drawing Sheets

(56) References Cited

U.S. PATENT DOCUMENTS

| | | | |
|---|---|---|---|
| 4,947,057 A * | 8/1990 | Czarnocki | G01F 1/698 327/509 |
| 5,107,812 A | 4/1992 | Takamoto | |
| 5,371,469 A | 12/1994 | Anderson | |
| 6,289,746 B1 | 9/2001 | Fu et al. | |
| 6,318,168 B1 | 11/2001 | Chidley et al. | |
| 6,752,014 B1 * | 6/2004 | Kanke | G01F 1/698 73/204.15 |
| 7,082,377 B1 | 7/2006 | Aslan | |
| 7,536,908 B2 | 5/2009 | Wang | |
| 7,797,997 B2 | 9/2010 | Wu | |
| 2003/0056585 A1 * | 3/2003 | Furuki | G01F 1/696 73/204.19 |
| 2009/0056410 A1 | 3/2009 | Ricks et al. | |
| 2017/0097252 A1 | 4/2017 | Huang et al. | |

FOREIGN PATENT DOCUMENTS

| | | | | |
|---|---|---|---|---|
| EP | 1 630 533 A1 | 3/2006 | | |
| EP | 3 404 373 A1 | 11/2018 | | |
| GB | 1 204 151 A | 9/1970 | | |
| GB | 1204151 | 9/1970 | | |
| JP | H04140613 A | 5/1992 | | |
| JP | 2004340936 A | * 12/2004 | ........... | G01F 1/6845 |

OTHER PUBLICATIONS

Jiang et al (F. Jiang, Y.C. Tai, C. M. Ho, and W. J. Li, "A Micromachined Polysilicon Hot-Wire Anemome-ter." Digest Solid-State Sensors & Actuator Workshop, Hilton Head, S.C., pp. 264-267, 1994).

Ashauer, M., et al. "Thermal flow sensor for liquids and gases based on combinations of two principles." Sensors and Actuators A: Physical 73.1-2 (1999): 7-13.

Kovasznay, L. S. G. et al., "Hot-wire investigation of the wake behind cyl-inders at low Reynolds numbers." Proceedings of the Royal Society of London. Series A. Mathematical and Physical Sciences 198.1053 (1949): 174-190.

Steurer, Johannes, and Franz Kohl. "Adaptive controlled thermal sensor for measuring gas flow" Sensors and Actuators A: Physical 65.2-3 (1998): 116-122.

Extended European Search Report corresponding to European Application No. 20213334.4 dated Jun. 8, 2021.

* cited by examiner

GAS FLOW MEASURING CIRCUIT AND GAS FLOW SENSOR

This application claims priority under 35 USC § 119 to European Patent Application Nos. 20 151 716.6, filed Jan. 14, 2020, and 20 213 334.4, filed Dec. 11, 2020, the entire disclosures of which are incorporated herein by reference.

TECHNICAL FIELD

The invention concerns a gas flow measuring circuit comprising at least one reference resistor outside the gas flow and at least one variable resistor in the gas flow that varies in accordance with the characteristics of the flow of a gas and means for determination of the difference between said reference resistor and variable resistor. The invention further concerns a gas flow sensor comprising sensor arrangement with a heating element, a controller and the gas flow measuring circuit.

BACKGROUND OF INVENTION

Such mass flow sensors are used in many applications for measuring the flow of a gas. The mass flow sensors are often constructed in silicon technology and comprise an electrode structure with, among other things, one or more heating element(s) that can be heated by an electric current, which is (are) mounted on a thin membrane. The temperature of the heating element depends on the heating current and the amount of heat dissipated by the heating element. The latter in turn depends on the thermal properties of the gas and its flow velocity along the heating element. The gas flowing past the membrane changes the temperature distribution on the membrane. In the flow direction upstream and downstream of the heating element, one or more sensor electrodes are arranged on the membrane to measure the temperature of the membrane and thus provide a measure of the flow. Alternatively, the quantity of gas flowing past can be determined, for example, from the temperature of the heating element at a constant heating current or from the heating power required to keep the heating element at a constant temperature. The sensor electrodes can be realized as resistors, which change their resistance in dependence of the temperature. The response time of such mass flow sensors to changes of flow or to changes of the current supplied to the heating element is usually at most a few milliseconds. Therefore, the current applied to the heating element must slowly changing in time to avoid disturbing the measurement.

Further, the gas flow sensor and the circuit comprise at least one reference resistor and the difference between the sensors and the reference resistor is evaluated for the detection of the gas flow or dependent of the measurement technique for gas properties.

Fluid flow can be measured using several techniques, each technique is well known in literature and patent prior-art exists since several years. Relevant techniques for this notification of invention are:
- calorimetric flow measurement using a thermoresistive MEMS sensor chip, described e.g. in U.S. Pat. No. 4,501,144 Higashi et al.;
- Anemometric flow sensor, described e.g. in Jiang et al (F. Jiang, Y. C. Tai, C. M. Ho, and W. J. Li, "A Micromachined Polysilicon Hot-Wire Anemometer." Digest Solid-State Sensors & Actuator Workshop, Hilton Head, S. C., pp. 264-267, 1994)
- Thermal Time of Flight flow sensor combined with another technique, described e.g. in Ashauer, M., et al. "Thermal flow sensor for liquids and gases based on combinations of two principles." Sensors and Actuators A: Physical 73.1-2 (1999): 7-13.
- Thermal Time of flight flow sensor, described e.g. in U.S. Pat. No. 7,797,997 Xiaozhong Wu et al. (priority 24 Aug. 2007)
- Thermal time of flight sensor based on sinusoidal excitation and phase shift detection, described e.g. in Kovasznay, L. S. G. et al., "Hot-wire investigation of the wake behind cylinders at low Reynolds numbers." Proceedings of the Royal Society of London. Series A. Mathematical and Physical Sciences 198.1053 (1949): 174-190
- Combination of techniques using separate sensors, described e.g. in U.S. Pat. No. 7,536,908 (priority 11 Apr. 2004)
- Adaptive digital control of a flow sensor heating circuit, described e.g. in Steurer, Johannes, and Franz Kohl. "Adaptive controlled thermal sensor for measuring gas flow" Sensors and Actuators A: Physical 65.2-3 (1998): 116-122

In general, each technique may be implemented using a thermoresistive sensor (e.g. a sensor measuring a change of temperature as a change of electrical resistance of sensing element) or a thermoelectric sensor (e.g. a sensor measuring a temperature difference between two spatially separated locations by using thermocouples emitting a voltage as a function of the temperature difference).

The calorimetric measurement principle determines the temperature difference between two temperature sensors placed upstream and downstream of a heating element. The heating element is heated at a temperature above the medium temperature, either at a constant temperature difference above the medium temperature or using a constant heating current. In general, a calorimetric measurement is suitable to measure small flows as it is very sensitive to small changes of flow from zero flow; however, when the flow increases the sensitivity tends to decrease.

The anemometric measurement principle measures the heating power necessary to maintain at a constant temperature a heater in a fluid flow or measures the temperature of a heating element in a fluid flow upon constant heating current. The anemometric measurement principle works using only one heater element without resorting to additional temperature sensors. In general, an anemometric measurement can measure large flows but at small flows, the sensitivity is very poor. Additionally, the anemometric principle is very sensitive to the thermal properties of the fluid being measured.

The thermal time of flight measurement principle measures the travel time of a heat pulse from the heater to a downstream temperature sensor: the faster the gas velocity the shorter is the travel time. The thermal time of flight measurement principle is less sensitive to the thermal properties of the fluid compared to the previously mentioned measurement principles. However, this measurement principle is not suitable for measuring zero flow as in this case, the travel time would become infinite and disturbances dominate the signal. For practical applications within gas flow measurements the thermal time of flight measurement principle can be realized by measuring the phase shift between a slow modulation applied to the heater and a downstream temperature sensor.

As it can be seen, each method has its own strengths and weaknesses. It has already been suggested to combine two methods (e.g. in the paper by Ashauer et al. or in U.S. Pat. No. 7,536,908 B2). Both prior-art documents mention separate sensing elements used for two different measurement types. This a direct consequence of using a thermoelectric element as in Ashauer et al. or a consequence of the signal measuring circuit used in U.S. Pat. No. 7,536,908 B2.

In prior-art documents, different sensing elements were used for different sensing techniques due to the limitations of the sensing principle based on thermoelectric sensing; or due to limitations of the sensing electronics based on a single Wheatstone bridge.

Thermoelectric sensors are only capable of measuring temperature differences between two locations and assumptions must be made to obtain an absolute measurement. As an Example EP 3 404 373 A1 shows a possible solution to partially overcome this type of issues. Thermoresistive devices are in principle suitable to determine an absolute temperature. However, the usual methods used for evaluating thermoresistive sensors within flow sensors are based on a Wheatstone bridge usually containing at least two variable resistances at different temperatures, thus making impossible to determine the absolute temperature of each variable resistance.

Prior art patent document U.S. Pat. No. 5,371,469 describes an approach for measuring small changes of thermoresistive elements based on connecting in series a stable current source with a first variable resistance and with a second reference resistance; then by measuring the voltage drops across each resistance and subtracting them. Several variable resistances may be measured by a suitable extension of the circuit.

An apparatus for driving a hot-wire air-flow sensor of constant temperature difference type disclosed in U.S. Pat. No. 4,334,186 includes a hot wire and a temperature sensitive compensating element such as a resistor for compensating temperature of air. The hot wire and the resistor are formed of identical elements. The hot wire is supplied by variable current source and the resistor is supplied by a constant current source. The temperature compensating resistor is used to directly sense the gas temperature as it is immersed in the gas and the temperature compensating resistor is temperature sensitive. The pulse train signal having a pulse width varying in correspondence to difference between voltage drops produced, respectively, across the hot wire and the compensating resistor supplied with a constant current is produced for interrupting the current supplied to the hot wire. The measurement principle is based on a "sampling and hold" technique combined with an integrator. The current is large so that the element and the gas are heated. Additionally, the current is pulsed to control the gas heating. The goal of this apparatus is to provide a simple correction of the sensor output. It is disclosed that the microcontroller output is used directly to control other equipment and that the output of a comparator is used to modify the duty ratio of the excitation current. This approach is passive and not active, and it would be sensitive to manufacturing tolerances of the components used leading to a poor accuracy.

CN 102829888 B discloses a method for eliminating three-wire heating resistor measurement errors. A three-wire heating resistor measuring circuit comprises a multi-way selecting switch (MUX), a programmable gain amplifier (PGA), an analog-digital converter (ADC), double constant current sources (IDAC1 and IDAC2), a reference voltage sampling resistor (Rref) and a three-wire heating resistor (RTD). The circuit is characterized in that the connection relationships of the two constant current sources (IDAC1 and IDAC2) and the heating resistor are exchanged through the multi-way selecting switch (MUX) during the measurement; the heating resistor is measured twice; and the average value of the two heating resistor measuring values is used as a reference calculation temperature value. The method has the advantages that with the processing method, the influence of a double constant current matching error on a heating resistor sampling value is eliminated greatly, and the high precision temperature acquisition is achieved.

U.S. Pat. No. 7,082,377 provides a temperature measurement circuit for a dual junction temperature sensor. The temperature measurement circuit is configured to provide separate bias currents to the junctions in the temperature sensor. The temperature measurement circuit includes two signal channels configured to provide an intermediate differential signal from a differential input signal that is received from the temperature sensor. In addition, the temperature measurement circuit may include one or more multiplexer circuits that are configured to control the intermediate differential signal. The temperature sensor circuit further includes a control circuit configured to adjust the bias currents and to control the multiplexer circuits such that several different differential voltages can be provided by the signal channels. Additionally, the temperature measurement circuit includes a conversion circuit that is configured to convert the differential voltage to a temperature signal, and to perform error cancellation based on the different differential voltages provided by the signal channels.

GB 1,204,151 claims a temperature measuring device comprising a temperature dependent resistor and a reference resistor of substantially constant resistance connected in series with one another and with a constant current source. The reference resistor is connected in series to the variable resistor and the single current source is connected to these two resistors. Means for picking-up the voltages across the two resistors, pulse operated switching means for supplying the voltages in time multiplex to a store, followed by difference forming means which provide a difference value as a measure of the temperature at the temperature dependent resistor.

The device according to EP 1 630 533 A1 has current generators to supply measuring resistors and a reference resistor, and a voltage ramp generator generating a voltage measuring ramp. A multiplexer device individually connects measuring points among resistors terminals to an operational amplifier's input. A counting device counts the time relating to electric potentials of the points. Temperature values are determined from the counted time. The device does not reveal an additional current loop, just an additional current source, which is used to charge a capacitor and in turn it is used to generate a time-dependent comparison voltage.

In U.S. Pat. No. 6,289,746 B1 a thermal pulsed micro flow sensor includes thermal sensors positioned in a fluid channel at downstream positions relative to a heater. Flow rate is measured by determining the time that it takes a thermal pulse to pass between two of the sensors. Since the resolution of the measurement increases with increasing distance between sensors while the accuracy of the measurement decreases, there is a conflict between the requirements of accuracy and short response time, as well as between accuracy and resolution. By providing at least three sensors and by varying the distances between the sensors, however, it is possible to select a pair of sensors having the highest resolution required by the application in which the sensor is used, while still ensuring that the velocity measurement is within the range of velocities accurately measurable by the selected sensors. Furthermore, for sensors having predetermined overlapping velocity measurement ranges, by selecting the distance between two sensors based on a desired accuracy, and by including an adjustment factor, a desired resolution can likewise be achieved. As a result, the cross-sectional area of the channel can be made constant, and the micro flow sensing device can be used for different flow conditions without having to adjust the sensors, or to use sensors having different characteristics. The reference element is placed in the gas flow.

SUMMARY OF INVENTION

The object of the present invention is to overcome the disadvantages of the prior art and to propose a high dynamic range flow sensor having a larger measurement range toward larger flows compared to a simple calorimetric measurement.

According to the invention, the measuring circuit and the flow sensor are capable to combine all three measurement principles mentioned previously. Depending on the measurement method, only a subset of the sensing elements may be actively read out and the basic gas flow measurement circuit is adapted accordingly. The gas flow measurement circuit comprises at least one current loop arrangement comprising first current source means coupled in series with the reference resistor and second current source means coupled in series with the variable resistor for providing an ideally constant current through the respective resistor. Both current sources should ideally provide the same currents, which only differ due to production tolerances. Accordingly, the current is very small so that only negligible self-heating of the sensing resistor due to the measuring current occur and the heating is only caused by heat transport from the heater element through the gas and through the sustaining membrane. Both variable resistor and reference resistor are connected to ground, therefore measuring the voltage across the resistor allows to determine the resistance value assuming the current is known. The resistors are connected to ground either directly or via a further resistor. In reality, the current varies depending on physical influences, e.g. temperature, manufacturing tolerances, so that the current is only substantially constant. Those variations are tolerated by the arrangement or may be corrected by calculation. The respective first voltages across the reference resistor and second voltages across the variable resistor are measured by voltage measuring means (subtractor) for measuring the voltage difference between the voltage at said reference resistor and the voltage at said variable resistor to produce a characteristic voltage difference representative of the characteristics of the gas. It is necessary to know the reference voltage across the reference resistor or to know the current and the reference resistor value. The reference resistor is meant to be a stable reference for the whole measurement system; therefore, the properties are insensitive to temperature changes and stable over time. Therefor the reference resistor is at least by a factor of 10, preferably 50 to 100, less temperature sensitive than the at least one variable resistor. To ensure a proper stability, the reference resistor is placed outside the gas stream to be measured to minimize any possible interaction. Additionally, it may be helpful to use few of such reference resistors connected in series or parallel to match better a desired value or to allow a wider measurement range. Adopting such a solution, would allow to dynamically selecting the number of resistors connected in series to obtain a very stable but still configurable reference or to reduce the resolution required by an ADC. It is to be noted that the purpose of the reference resistors is to provide a reference voltage to perform further differential measurements and no gas property is directly measured by the reference resistors.

Applied to mass flow meters at least the upstream sensing, downstream sensing and gas temperature sensing resistors can be evaluated by this arrangement.

FIG. 7 shows a schematic overview of the sensing elements realized as resistors, where "US" means upstream of the heater element and "DS" downstream of the heater element considering the indicated flow direction. Additionally, at least one reference resistor is indicated by "Rref" and it is not exposed to the gas flow to be measured. That resistor may substituted by at least two resistors connected in series.

As mentioned above, depending on the measurement method only a subset of the sensing elements may be actively read out, following table summarizes the sensing elements used for each measurement method:

| Thermoresistive element/Sensing element | Measurement method | | |
|---|---|---|---|
| | Calorimetric | Anemometric | Time of Flight (TOF) |
| Heater | Active, constant setpoint | Active, constant setpoint, required heating power measured | Active, modulated or pulsed setpoint |
| Gas temperature sensor | Active, used to define setpoint. Readout comparing to reference resistors possible. | Active, used to define setpoint. Readout comparing to reference resistors possible. | Optionally active, may be used to define average setpoint. Readout comparing to reference resistors possible. |
| Upstream (US) and downstream (DS) sensors | Active, readout using reference resistors required for high precision absolute temperature measurement. | Not used | Active. Readout comparing a pair of US/DS resistors by multiplexing possible. Readout of a single US or DS sensor comparing to reference resistor possible. Readout of a pair of US and DS sensor comparing to reference resistor possible. |

| | Measurement method | | |
|---|---|---|---|
| Thermoresistive element/Sensing element | Calorimetric | Anemometric | Time of Flight (TOF) |
| Reference resistor(s) | Required for precision absolute temperature measurement of US/DS sensors. May be used for precision measurement of gas temperature. | May be used for precision measurement of gas temperature. | May be used for precision measurement of DS sensor temperature |

The fundamental measurement method is the calorimetric measurement method using absolute measurement as explained above because this method allows for a sensitive determination of zero flow and allows to determine the flow direction (forward, e.g. in the arrow direction or backward e.g. against the arrow direction).

The anemometric measurement method is always available in parallel to calorimetric measurement as it only requires measuring the heating power necessary to maintain the desired setpoint.

Time of flight may be used only above a certain flow or only if respective requirements exist. Time of flight measurement may be performed in parallel to the other methods (e.g. by splitting the signal in AC and DC components) or sequentially by modulating (TOF) or not modulating (calorimetric and Anemometric) the heater setpoint temperature.

Comparing with prior art in this invention a simpler approach is disclosed for absolute measurements by using a current loop arrangement based on multiple current sources. The current loop arrangement is simpler to implement as only one voltage measurement means (subtractor) is necessary. In an idealized situation both current source means emit exactly the same current. In a real circuit two independent current sources will drift and emit slightly different currents, such current deviations would directly influence the measured signal. To overcome this issue, according an embodiment of the invention, the arrangement comprises current source multiplexing means alternately electrically coupling the first current source means and the second current source means in series with the reference resistor and the variable resistor, respectively. By integrating a switching mechanism (multiplexer or multiplexing means), each current source can be alternately connected to each resistor (variable or reference). Therefore, the current sourced by each source can be continuously monitored and the variable resistor can be precisely measured under the assumptions that the current sources stay constant within two measurements and that the reference resistors stay constant for the operating lifetime of the device.

This technique allows determining the relative change of the variable resistor compared to the reference resistor. Thus, the voltage input multiplexing means may alternately electrically switch the input of the voltage measuring means to the reference resistor and the variable resistor, respectively. In this mode of operation, the sensing and reference resistor would be alternatively connected to each input of the voltage subtractor. This improvement involves the use of an additional multiplexer to switch the inputs of the subtractor. Switching the inputs allows to effectively remove possible temperature dependant offsets or other offsets between the input terminals of the subtractor.

The method can be expanded to sequentially measure several variable resistors or may be modified to measure several variable resistors in parallel by using more current source means, more multiplexing means and more reference resistors (each parallel measurement requires two additional current sources, one additional reference, suitable multiplexers and one more subtractor). The measurement of additional variable resistors requires multiplexing means supporting more connections so that each variable resistor is compared with the reference resistor.

In case of a wide range of possible values of the variable resistors another preferred embodiment of the invention uses more than one reference resistors connected in series. With an appropriate multiplexing means the most appropriate effective value of the reference resistor is switched to one input of the voltage measuring means. This minimizes the voltage difference between reference resistor and variable resistor or to select an otherwise appropriate reference value. The variable resistor is connected to the other input of the voltage measuring means. As mentioned above different variable resistors also may be switched by respective multiplexing means to the other input of the voltage measuring means.

In another embodiment of the invention, the measuring circuit comprises at least one further variable resistor and variable resistor multiplexing means alternately electrically coupling the variable resistors in series with the respective current source means so that each variable resistor is compared with the reference resistor. That embodiment allows the use of more than one variable resistor for respective measurement applications and/or temperature dependencies of the resistors. Consequently, at least one further reference resistor and reference resistor multiplexing means may alternately electrically couple the reference resistors in series with the respective current source means so that each variable resistor is compared with the respective reference resistor. In view of that, a mass flow meter system may be further expanded to measure more upstream and downstream sensing resistors placed at a different distance from the central heating element to further improve the dynamic range of a flow sensor.

For further measuring applications, the gas flow measuring circuit may also comprise at least one further current loop arrangement to produce a further characteristic voltage difference representative of a further characteristic of the gas.

Under the assumption that the value of the reference resistor may be considered constant independently of the environment temperature it is possible to determine the absolute value of the variable resistor too. Additionally, knowing the temperature coefficient of resistance of the variable resistor it is then possible to determine the absolute temperature of the variable resistor.

According to the invention, the gas flow sensor comprises a sensor arrangement with a heating element and a controller, and a gas flow measuring circuit as discussed above. In detail the gas sensor comprises a set of variable resistors as a set of sensing elements in the gas flow, wherein at least one of the resistors works as at least one of a gas temperature sensor, an upstream sensor, and a downstream sensor. Preferably, the controller is adapted to control at least of two separate resistors in series as reference resistor by alternately multiplexing the one input of the voltage measuring means to at least one of the separate resistors in series representing the reference resistor for minimizing the voltage difference between reference resistor and variable resistor or to select an otherwise appropriate reference value as mentioned above.

Depending on the measurement methods discussed in the table above, according to a preferred embodiment of the invention, the controller or control circuit is adapted to control from the set of sensing elements a subset of sensing elements according to a defined measurement method.

For calorimetric measurement of the gas flow, the controller is according to a preferred embodiment of the invention adapted to use from the set of sensing elements the heating element, the gas temperature sensor, at least one upstream and/or at least one downstream sensor, and at least one reference resistor. This is not limited to control the heating element by using a current loop. This can be performed also by other known solutions for a person skilled in the art. Using a current loop arrangement for the heater might be too complex and not really necessary.

The controller for calorimetric measurement is adapted to control the heating element to a defined temperature at a setpoint relative to the gas temperature sensor or absolute. Further, the controller is adapted to control the at least one upstream and at least one downstream resistor by multiplexing these resistors and coupling them alternately in series with the respective current source means so that each upstream and downstream resistor is supplied with an ideally constant and equal current and is compared with the reference resistor. Alternatively, the controller may be adapted to control reference resistor multiplexing means alternately electrically coupling the at least two reference resistors in series with the respective current source means. Further, the controller may be adapted to control at least one upstream and at least one downstream resistor by multiplexing these resistors and coupling them alternately in series with the respective current source means so that each upstream and downstream resistor is compared with a respective reference resistor. Alternatively, the controller may be adapted to control at least one further current loop arrangement, wherein one of the at least two current loop arrangements comprises at least one upstream resistor and one of the at least two current loop arrangements comprises at least one downstream resistor. Finally, the controller is adapted to determine additional relevant data concerning the gas flow and gas properties received from the voltage measuring means depending on the received voltage difference between said reference resistor or reference resistors and said at least one upstream and at least one downstream resistor.

According to further preferred embodiment for anemometric measurement of the gas flow, the controller is adapted to use from the set of sensing elements the heating element, the gas temperature sensor, and, in case that a gas temperature measurement is additionally performed, the reference resistor. In an additional embodiment of the invention, the controller is adapted to control the heating power for the heating element on a constant temperature setpoint depending on the temperature of the gas temperature resistor and to determine relevant data concerning the required heating power and its changes.

For time of flight measurement of the gas flow the controller, according to a further preferred embodiment of the invention, is adapted to use from the set of sensing elements the heating element, at least one upstream and/or at least one downstream sensor, and optionally to use the gas temperature sensor for defining an average setpoint. Optionally the controller is adapted to use the reference resistor in case of a comparison of the gas temperature sensor to one or more reference resistors. Time of flight measurement can be realized reading only one of the upstream or downstream sensors, however better results are achieved when reading both. Time of flight measurement is based on a time-dependent setpoint definition and a time-dependent measurement. The measured value is proportional to the transit time e.g. the time difference between setpoint change and temperature change at sensor. This may be implemented as setpoint pulses or a periodic (e.g. sine-wave, triangular wave, etc.) setpoint modulation. The transit time is then similar to a phase shift. The modulation is slower than 1 kHz, preferably slower than 250 Hz.

For time of flight measurement the controller may also be adapted to control the heating element by changing the temperature setpoint and to control the at least one upstream and/or at least one downstream resistors by multiplexing these resistors and coupling them alternately in series with the respective current source means so that each upstream and downstream resistor is compared with the respective heating element temperature setpoint. Further the controller may be adapted either to couple first current source means in series with at least one reference resistor and to couple second current source means in series with said gas temperature resistor for comparing said reference resistor and said gas temperature resistor, or to control one or two upstream resistors or one or two downstream sensors directly or by multiplexing by alternately coupling, respectively, in series with the respective current source means and to couple in series current source means with the reference resistor for comparing each upstream and downstream resistor or a pair of upstream or downstream resistors, respectively, with the reference resistor. Finally, the controller may be adapted to determine time-dependent data concerning the gas flow or the gas received from the voltage measuring means. The time necessary for a thermal signal to travel from heater to sensor is determined.

According to one embodiment of the invention, the controller controls the measurement of the gas flow depending on the requirements by two of the measurement principles calorimetric measurement, anemometric measurement, and time of flight measurement. Further, the controller determines the gas characteristics dependent on the results of the single measurements or the combination of the measurements according to the different principles.

At runtime, the computed gas flows based on three different measurement principles may be verified against each other to ensure reliable measurements and to detect sensor failures. As some of the sensors are less sensitive in certain flow ranges, only a subset of measurement may be used for consistency check.

Comparing the results from different measurement principles may furthermore allow obtaining some information on the gas used by comparing the expected values with a set of reference values. The temperature measured at the sensing resistors for a given heater setpoint (obtained e.g. from absolute calorimetric measurement at zero flow), the heating power necessary to maintain the setpoint (obtained e.g. by anemometric measurements at zero flow) will be a function of the gas properties such as thermal conductivity, specific heat, density and viscosity. If the measured values do not correspond to the expected values for the gas selected by the user it is possible to warn the user about a possible wrong gas or to detect other issues in the user equipment like gas leaks, improper mixing, improper connection etc.

Additionally, the absolute values of the sensing resistor are regularly compared to a reference resistor thus making easily possible to detect a failure of the sensing resistors due to mechanical breakage of the membrane or other damage. In the prior art it is usually not easily possible to distinguish a broken sensor from a sensor measuring zero flow as in both cases the measured voltage difference is nominally zero volts.

According to the invention, the measuring circuit and the gas flow sensor are capable to combine all three measurement principles using the same set of thermoresistive elements thereby providing a larger measurement range of at least a factor 5 toward larger flows compared to a simple calorimetric measurement. In the present invention, the same set of sensing elements based on thermoresistive measurements (metallic Platinum sensing elements) are used for performing all measurements. By using the same sensing elements for all techniques, it is possible to realize a more compact sensor, to limit the number of bond wires and to build more compact electronics. Additionally, all measurement methods measure the flow at the same position thus avoiding a disagreement between sensors due to different measurement positions.

In this invention, the ambient temperature is continuously measured (possibly integrated into the circuitry explained above) and the heater temperature is continuously measured. The heating current is then controlled so that heater temperature and setpoint agree. Initial values for both reference and heater resistors may be collected during an initial calibration step to insure a reliable temperature measurement. The setpoint may be defined digitally by a microcontroller and suitable firmware, and the heater current or voltage is emitted by a digitally controllable source (e.g. Voltage Controlled Current Source or digital to analog converter). In this case the control algorithm must be able to control the temperature within few milliseconds of a flow change. Alternatively, the setpoint may be defined digitally and used to define the setpoint of an analog control loop, in this case the control algorithm must update the setpoint only upon changes of the gas temperature sensor reading which typically happen at a time scale of several seconds to minutes. The heating current is in this case controlled by a quick analog feedback loop. In both cases the heater driving current should be kept constant if no changes of ambient temperature, gas flow or setpoint occur. Using a pulsed signal (e.g. pulse-width modulated driving) is detrimental for the performance.

In the following, embodiments of the invention are described in detail in connection with the drawings. However, the invention is not limited to the examples described in connection with the drawings and includes all embodiments covered by the claims and the description alone or in connection with each other. The features and feature combinations described above and below in connection with the drawings as well as the features and their combinations shown in the figures are also useable alone or in other combinations. In addition, any single feature of any independent or parallel claim may be replaced by another disclosed feature or feature combination. All features and/or advantages derivable from the claims, the description or the drawings, including structural details, spatial layout and process steps may be, per se or in any combination, essential to the invention.

DETAILED DESCRIPTION

Figure 1:
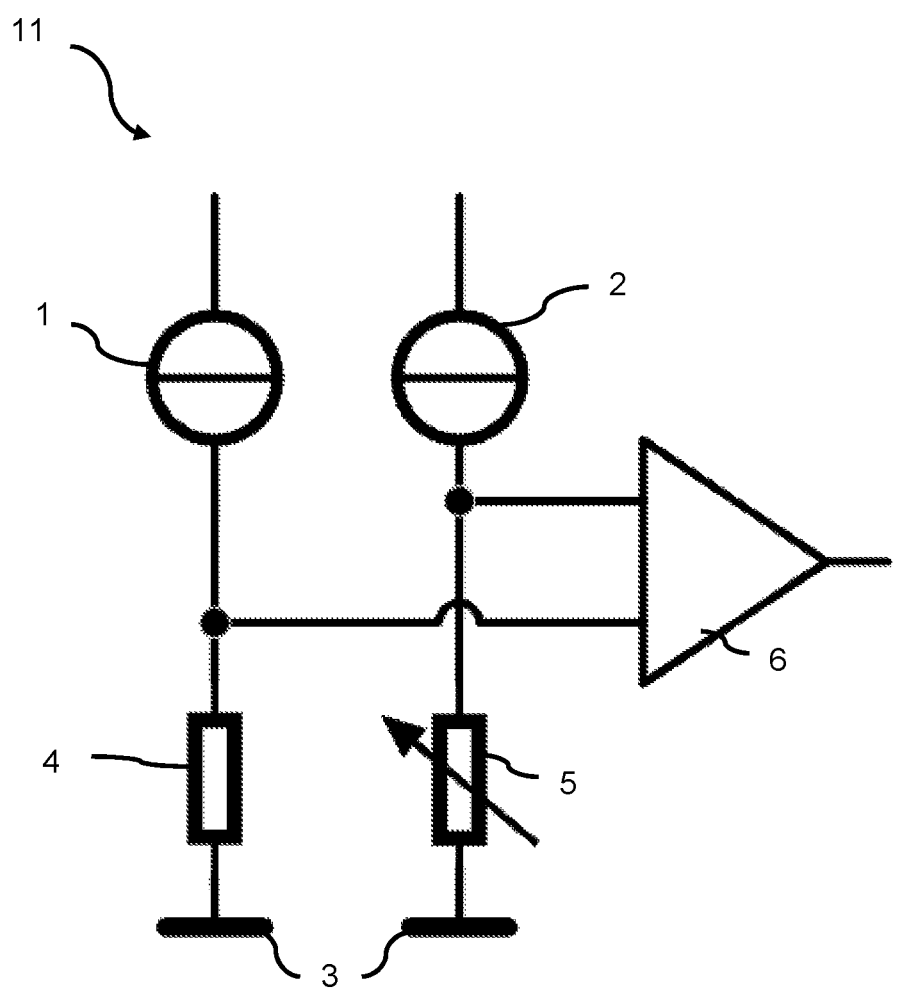
FIG. 1 a gas flow measuring circuit using two identical current sources.
Figure 2:
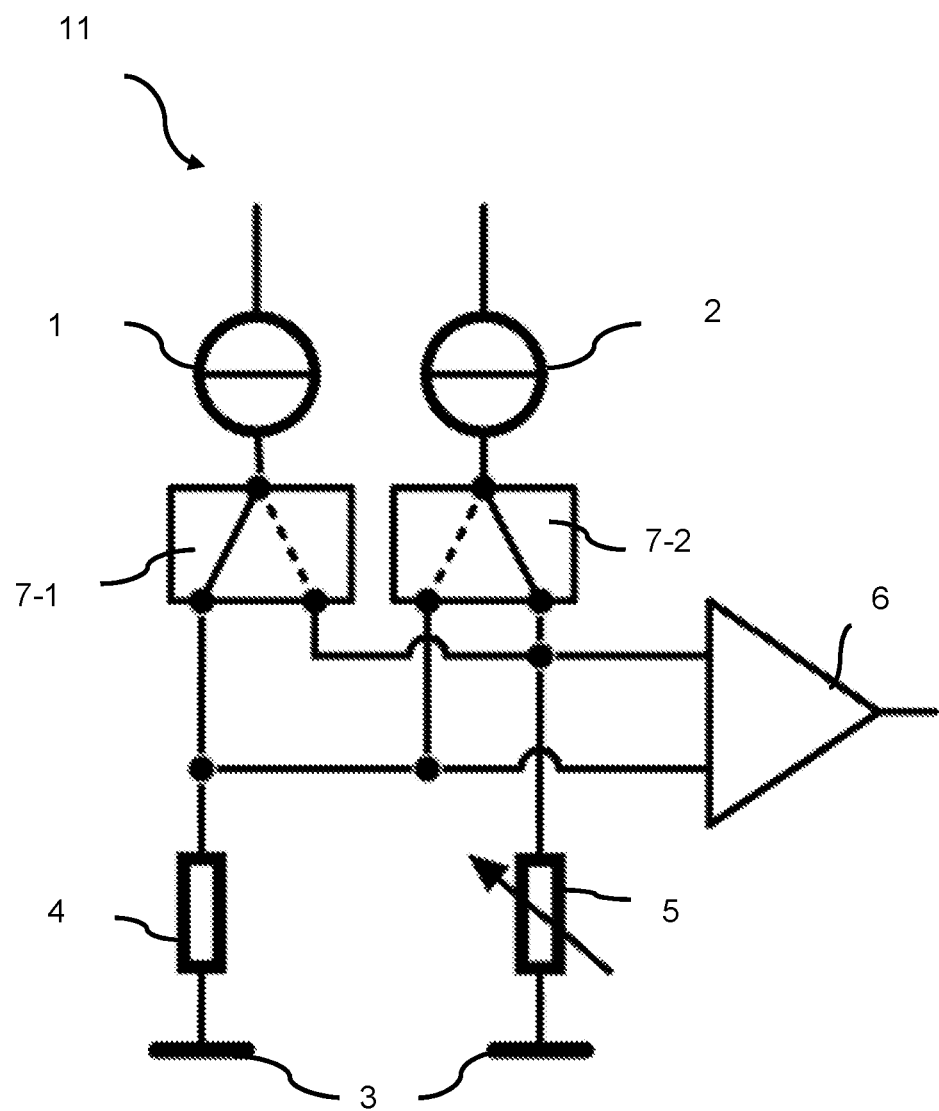
FIG. 2 a gas flow measuring circuit adding the capability of selecting which current source is connected to each resistive element.
Figure 3:
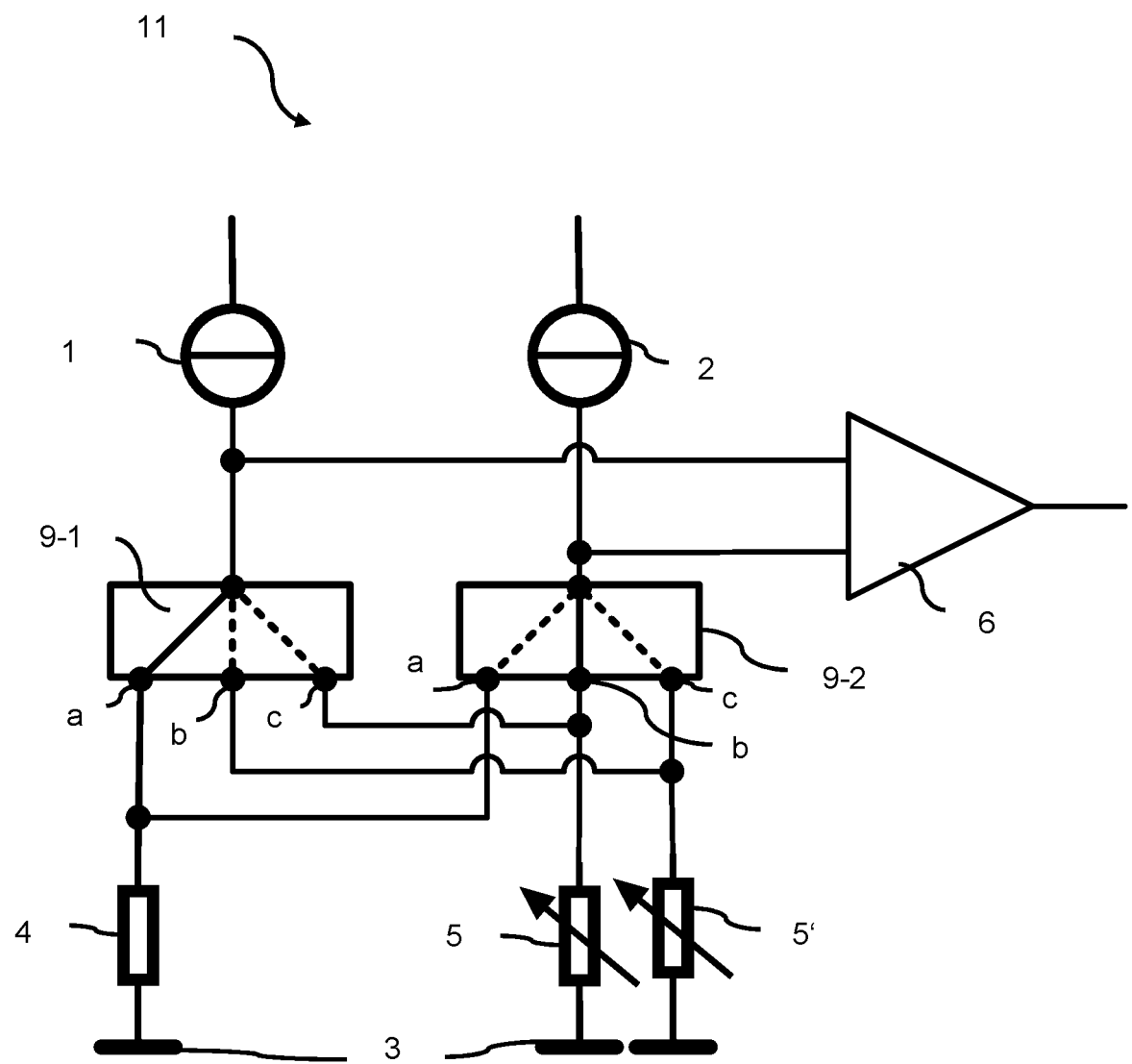
FIG. 3 a gas flow measuring circuit allowing to measure one additional variable resistor.
Figure 4:
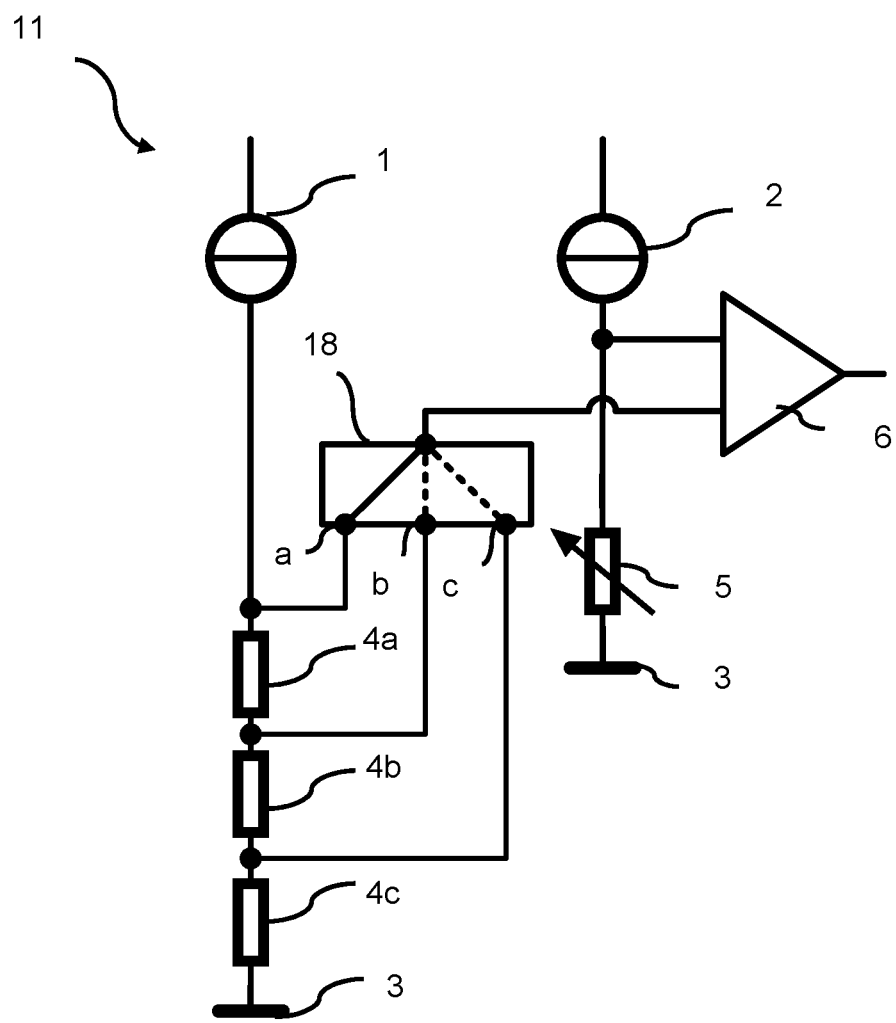
FIG. 4 a gas flow measuring circuit suitable for accepting a wide range of variable resistors values.

FIGS. 2 to 4 show some schematic exemplary variations based on a schematically depicted basic gas flow measuring circuit 11 with a current loop arrangement shown in FIG. 1. As shown in the depiction above, the chip used as a gas sensor is arranged in the usual manner and know from the prior art on a carrier and comprises a membrane made from an insulating material. A gas temperature sensor is arranged on the chip and the heater as well as (for example in the depiction) two upstream sensors (US Sensor 1 and US Sensor 2) and two downstream sensors (DS Sensor 1 and DS Sensor 2) with regard to the direction of the flow according to the arrow.

The schematic basic current loop arrangement of the gas flow measuring circuit 11 shown in FIG. 1 comprises two independent current sources 1, 2, each being connect to ground 3 via a resistor 4, 5. Resistor 4 is in this embodiment reference resistor Rref and resistor 5 a variable resistor Rx. An instrumental amplifier 6 (subtractor) determines the voltage difference of the voltages at the resistors 4, 5. Therefore the inputs of the instrumental amplifier 6 (subtractor) are connected to the other side of the resistors 4, 5. In an idealized situation both current sources 1, 2 emit exactly the same current. In a real circuit two independent current sources 1, 2 will drift and emit slightly different currents, such current deviations would directly influence the measured signal.

According to FIG. 2 the current sources 1, 2 are switched by multiplexers 7-1 and 7-2 so that each current source 1, 2 can be alternately connected to each resistor 4, 5. As a consequence, the current sourced by each current source 1, 2 can be continuously monitored and the variable resistance of the resistor Rx can be precisely measured under the assumption that the current sources 1, 2 stay constant within two measurements.

As mentioned above the single elements or the current loop arrangement according to FIG. 1 in total can be expanded to sequentially measure several variable resistors Rx or may be modified to measure several variable resistors Rx in parallel by using more current sources 1, 2, more multiplexers 7-1 and 7-2 and more reference resistors Rref (each parallel measurement requires two additional current sources 1, 2, one additional reference resistor Rref, suitable multiplexers 7-1 and 7-2 and one more subtractor 6). The measurement of additional variable resistors Rx requires a multiplexer 7-1 and 7-2 supporting more connections so that each variable resistor 5 is compared with the reference resistor Rref.

In the gas flow measuring circuit 11 according to the embodiment of FIG. 3, the multiplexers 7-1 and 7-2 of FIG. 2 are extended in order to measure two variable resistors Rx1 and Rx2. As shown, the multiplexers 9-1 and 9-2 of current loop arrangement allow to switch the reference resistor Rref 4 and the variable resistor Rx between the current sources 1, 2 and between the resistors 5, 5' being variable resistors Rx1 and Rx2, respectively. The following table shows the different switching positions:

| Multiplexer 9-1 | Multiplexer 9-2 | Current Source 1 | Current Source 2 |
| --- | --- | --- | --- |
| a | b | Rref | Rx1 |
| a | c | Rref | Rx2 |
| b | a | Rx2 | Rref |
| c | a | Rx1 | Rref |

According to FIG. 4 three reference resistors 4a, 4b, 4c are connected in series. A multiplexer 18 can be set to position a so that the three resistors 4a, 4b, and 4c are connected, thus realizing Rref=R4a+R4b+R4c. By setting position b, the two resistors 4b and 4c are connected in series, thus realizing Rref=R4b+R4c. Finally, by setting position c, only the resistor 4c is connected in series, thus realizing Rref=R4c. In difference to FIG. 3 the resistors are not switched between the current sources 1, 2. Selecting the multiplexer position thus allows to select a value for the reference resistor and to deliver the most appropriate reference voltage suitable for measuring the variable resistor by mean of the instrumental amplifier (subtractor) 6. The number of reference resistors connected in series may be varied according to the desired range.

Figure 5:
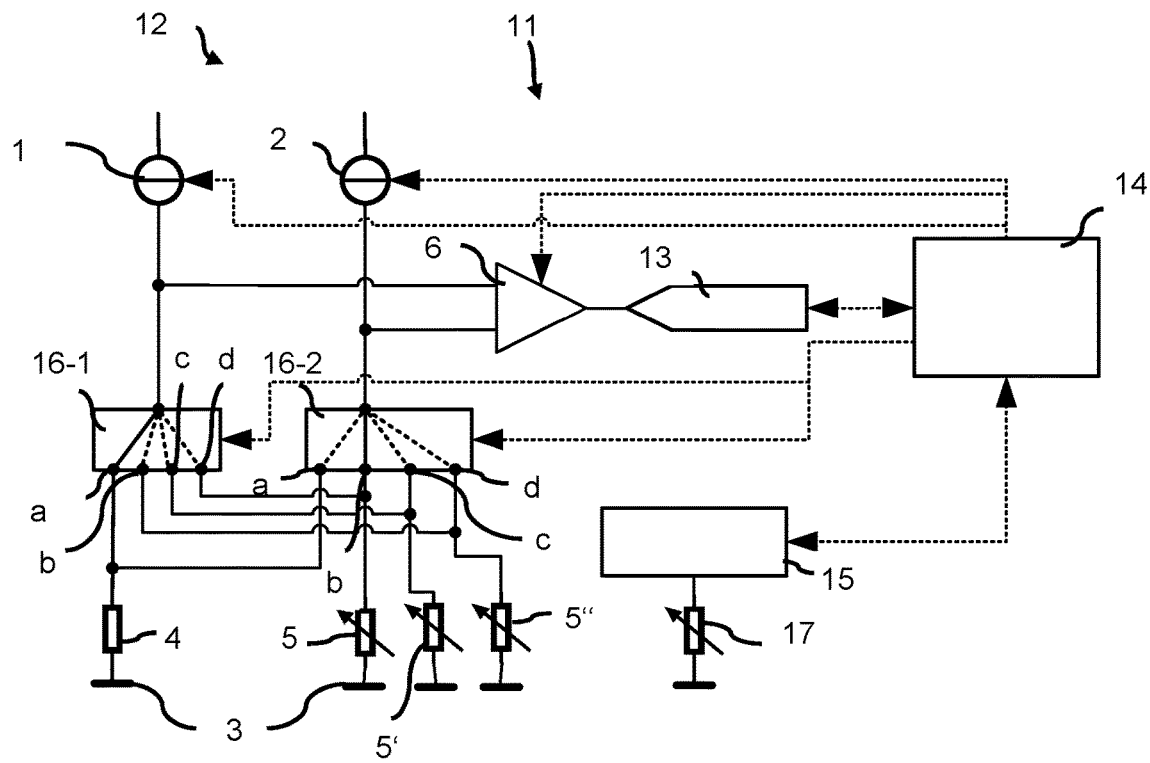
FIG. 5 a block diagram of the gas flow sensor with multiplexing means for the current sources and several variable resistors.

FIG. 5 shows a schematic block diagram of an embodiment of a gas sensor 12 according to the invention comprising a gas flow measuring circuit 11 with the gas sensor current loop arrangement similar to the embodiment of FIG. 3 with its output from the subtractor 6 being connected to an analog/digital converter 13 which output is connected to a controller 14. The controller 14 controls via a heater control 15 a heater 17 in form of a resistor. The controller 14 further controls a multiplexer 16-1 and a multiplexer 16-2 similar to the embodiment of FIG. 5 of the gas flow measuring circuit 11 as well as the current sources 1, 2. The gas flow measuring circuit 11 comprises in this embodiment a resistor 4 as reference resistor Rref and variable resistors 5, 5' and 5" acting as gas temperature resistor Rt, upstream resistor Rus1 and downstream resistor Rds1, respectively. The connection of these resistors Rref, Rt, Rus1, and Rds1 with the multiplexer 16-1, 16-2, respectively, leads to the following switching positions for a sensor measurement:

| Multiplexer 16-1 | Multiplexer 16-2 | Current Source 1 | Current Source 2 |
| --- | --- | --- | --- |
| a | b | Rref | Rt |
| a | c | Rref | Rus1 |
| a | d | Rref | Rds1 |
| d | a | Rds1 | Rref |
| c | a | Rus1 | Rref |
| b | a | Rt | Rref |

Figure 6:
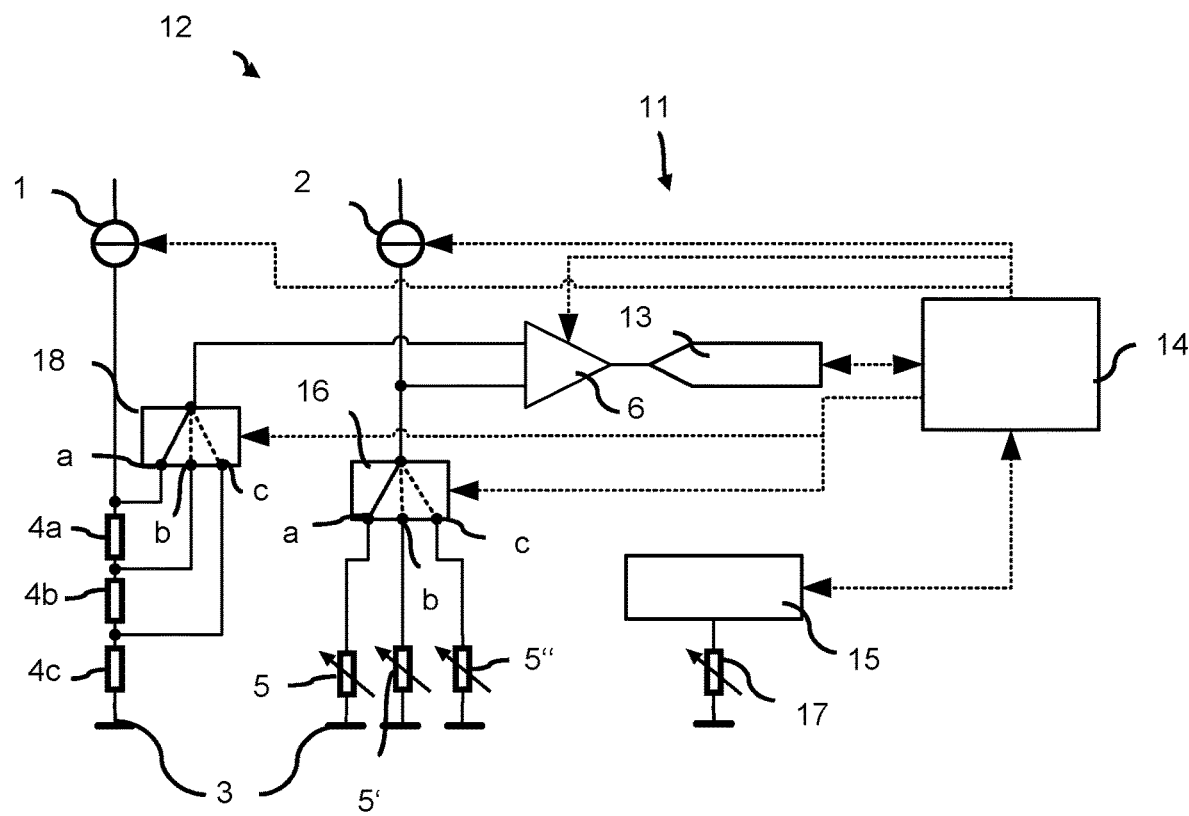
FIG. 6 a block diagram of the gas flow sensor with a gas flow measuring circuit suitable for accepting a wide range of variable resistors values.
Figure 7:
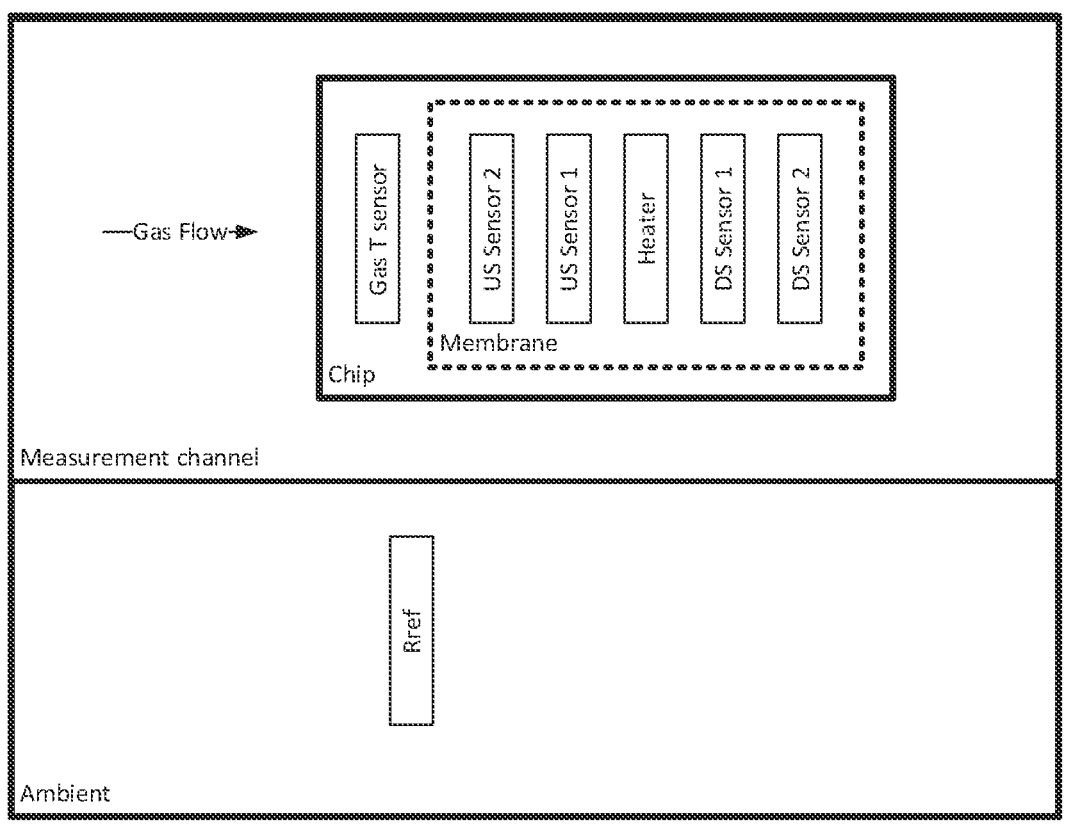
FIG. 7 a schematic overview of the sensing elements.

FIG. 6 shows the schematic block diagram similar to the block diagram of FIG. 5 with an embodiment of a gas sensor 12 according to the invention comprising a gas flow measuring circuit 11 with the gas sensor current loop arrangement similar to the embodiment of FIG. 4. There is no switching of resistors Rref and Rx between the current sources 1, 2, but a selection between the reference resistors 4a, 4b, 4c by the multiplexer 18 and a selection between the variable resistors 5, 5', 5" by the multiplexer 16.

The invention claimed is:

1. A gas flow measuring circuit comprising at least one reference resistor outside the gas flow and at least one variable resistor that varies in accordance with the characteristics of the flow of a gas and voltage measuring means for determination of a voltage difference between the at least one reference resistor and the at least one variable resistor, wherein the at least one reference resistor is arranged outside the gas flow and is at least by a factor of 10 less temperature sensitive than the at least one variable resistor, at least one current loop arrangement, the at least one current loop arrangement comprising a first current source coupled in series with the at least one reference resistor and a second current source coupled in series with the at least one variable resistor wherein both the at least one reference resistor and the at least one variable resistor are connected to ground for respectively providing an ideally constant and equal current through the at least one reference resistor and through the at least one variable resistor to produce first voltages across the at least one reference resistor and second voltages across the at least one variable resistor, and wherein the voltage measuring means is adapted to measure the voltage difference between the at least one reference resistor and the at least one variable resistor to produce a characteristic voltage difference representative of the characteristics of the gas.

2. The gas flow measuring circuit according to claim 1, comprising a current source multiplexer adapted to alternately electrically couple the first current source and the second current source in series with the at least one reference resistor and the at least one variable resistor, respectively.

3. The gas flow measuring circuit according to claim 1, wherein the at least one reference resistor comprises at least two separate resistors in series, and wherein the gas flow measuring circuit further comprises a reference resistor input multiplexer adapted to alternately electrically switch one input of the voltage measuring means to at least one of the at least two separate resistors in series representing the at least one reference resistor; and wherein the at least one variable resistor is connected to an other input of the voltage measuring means.

4. The gas flow measuring circuit according to claim 1, comprising at least a further variable resistor and a variable resistor multiplexer adapted to alternately electrically couple the at least one variable resistor and the at least the further variable resistor in series with the first current source and the second current source so that one of the first current source and the second current source is connected to one of the at least one variable resistor or the at least the further variable resistor and the other one of the first current source and the second current source is connected to the at least one reference resistor and each of the at least one variable resistor and the at least the further variable resistor is compared with the reference resistor.

5. A gas flow sensor comprising sensor arrangement with a heating element and a controller, and a gas flow measuring circuit according to claim 1, including a set of variable resistors as a set of sensing elements in the gas flow, wherein at least one of the set of variable resistors works as at least one of a gas temperature sensor, at least one upstream sensor, and at least one downstream sensor.

6. The gas flow sensor according to claim 5, wherein the controller is adapted to control at least two separate resistors in series by alternately multiplexing one input of the voltage measuring means to at least one of the at least two separate resistors in series representing the at least one reference resistor.

7. The gas flow sensor according to claim 5, wherein the controller is adapted to control from the set of sensing elements a subset of sensing elements according to a defined measurement method.

8. The gas flow sensor according to claim 7, wherein for calorimetric measurement of the gas flow the controller is adapted to use from the set of sensing elements the heating element, the gas temperature sensor, the at least one upstream sensor and/or the at least one downstream sensor, and the at least one reference resistor.

9. The gas flow sensor according to claim 8, wherein the controller is adapted to control the heating element to a defined temperature at a setpoint, to control the at least one upstream resistor and/or the at least one downstream sensor by multiplexing the at least one upstream sensor and/or the at least one downstream sensor and coupling the at least one upstream sensor and/or the at least one downstream sensor alternately in series with the first current source or the second current source so that each of the at least one upstream sensor and/or each of the at least one downstream sensor is supplied with an ideally constant and equal current and is compared with the at least one reference resistor, to determine relevant data concerning the gas flow received from the voltage measuring means depending on the received voltage difference between the at least one reference resistor and the at least one upstream sensor and/or the at least one downstream sensor.

10. The gas flow sensor according to claim 7, wherein for anemometric measurement of the gas flow the controller is adapted to use from that set of sensing elements the heating element, the gas temperature sensor, and, in case that a gas temperature measurement additionally is performed, the at least one reference resistor.

11. The gas flow sensor according to claim 10, wherein the controller is adapted to control the heating power for the heating element on a constant temperature setpoint depending on the temperature of the gas temperature sensor and to determine relevant data concerning the required heating power and its changes.

12. The gas flow sensor according to claim 7, wherein for time of flight measurement of the gas flow the controller is adapted to use from the set of sensing elements the heating element, the at least one upstream and/or the at least one downstream sensor, and optionally to use the gas temperature sensor for defining an average setpoint and optionally to use the at least one reference resistor in case of a comparison of the gas temperature sensor to one or more of the at least one reference resistor.

13. The gas flow sensor according to claim 5, wherein the controller controls the measurement of the gas flow depending on requirements of at least two measurement principles of a calorimetric measurement principle, an anemometric measurement principle, or a time of flight measurement principle and determines the gas characteristics.

* * * * *